Feb. 17, 1931.　　　F. B. MacLAREN　　　1,792,649
REFRIGERATING MECHANISM
Filed July 24, 1923　　6 Sheets-Sheet 3

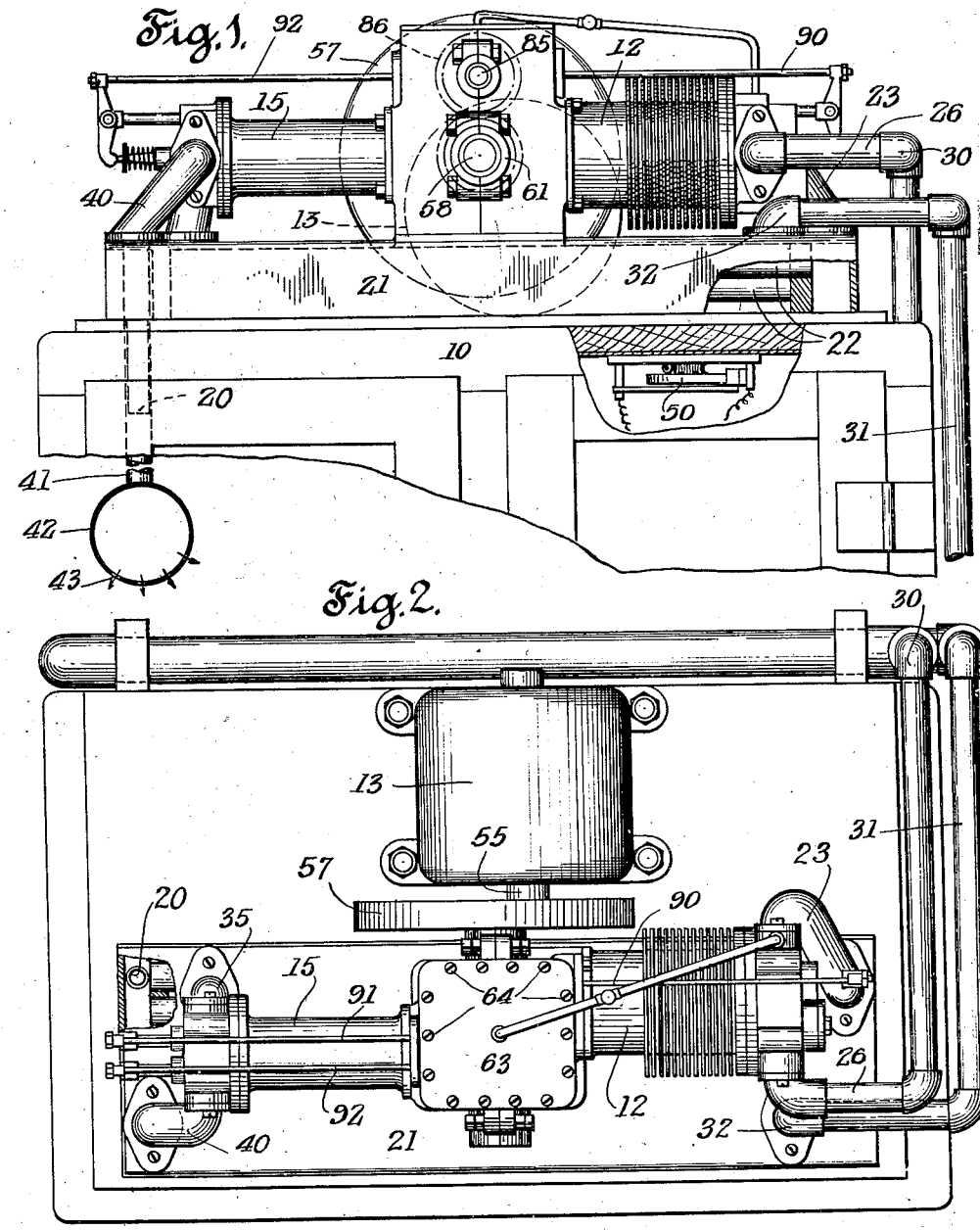

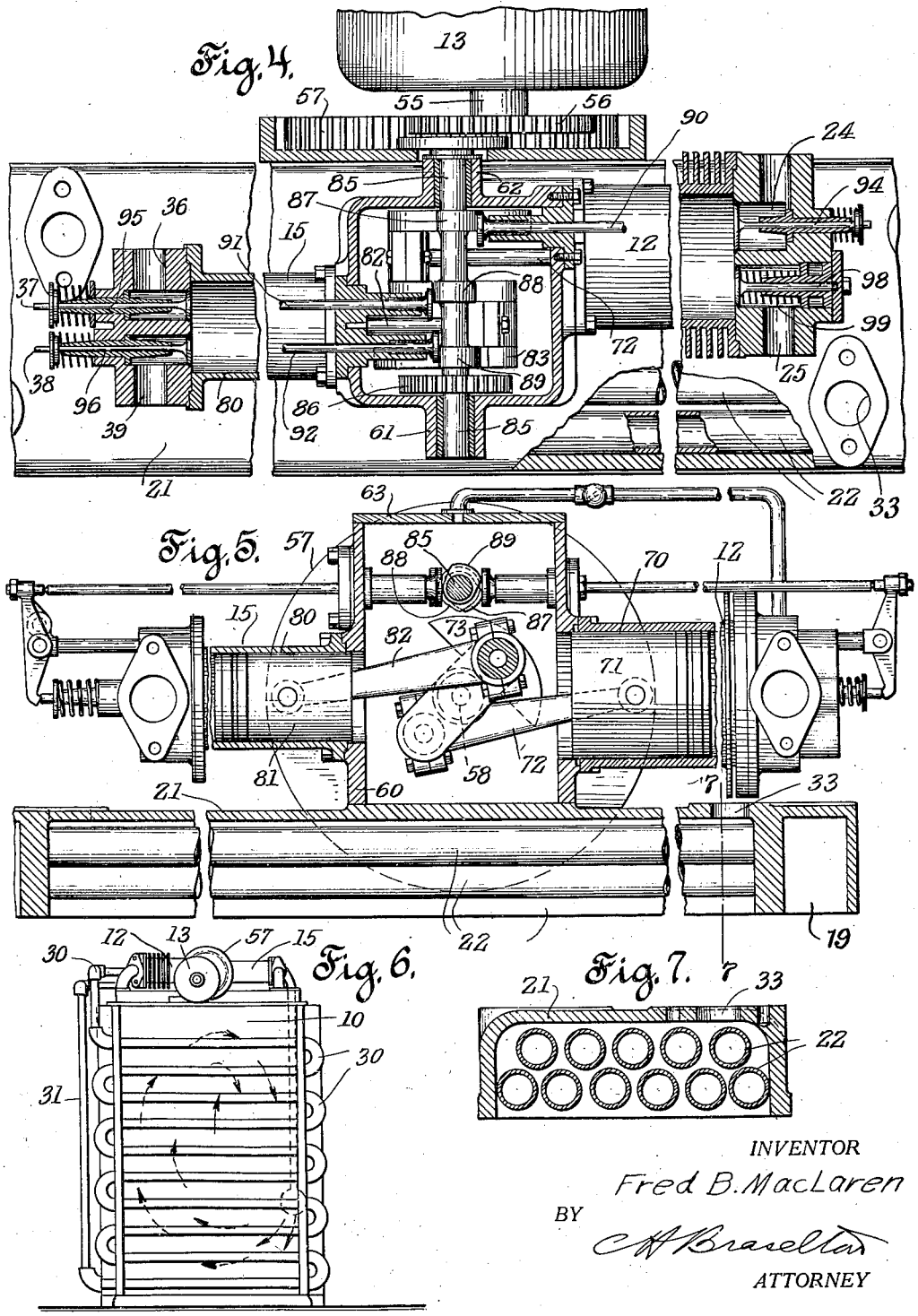

INVENTOR
Fred B MacLaren
BY
ATTORNEY

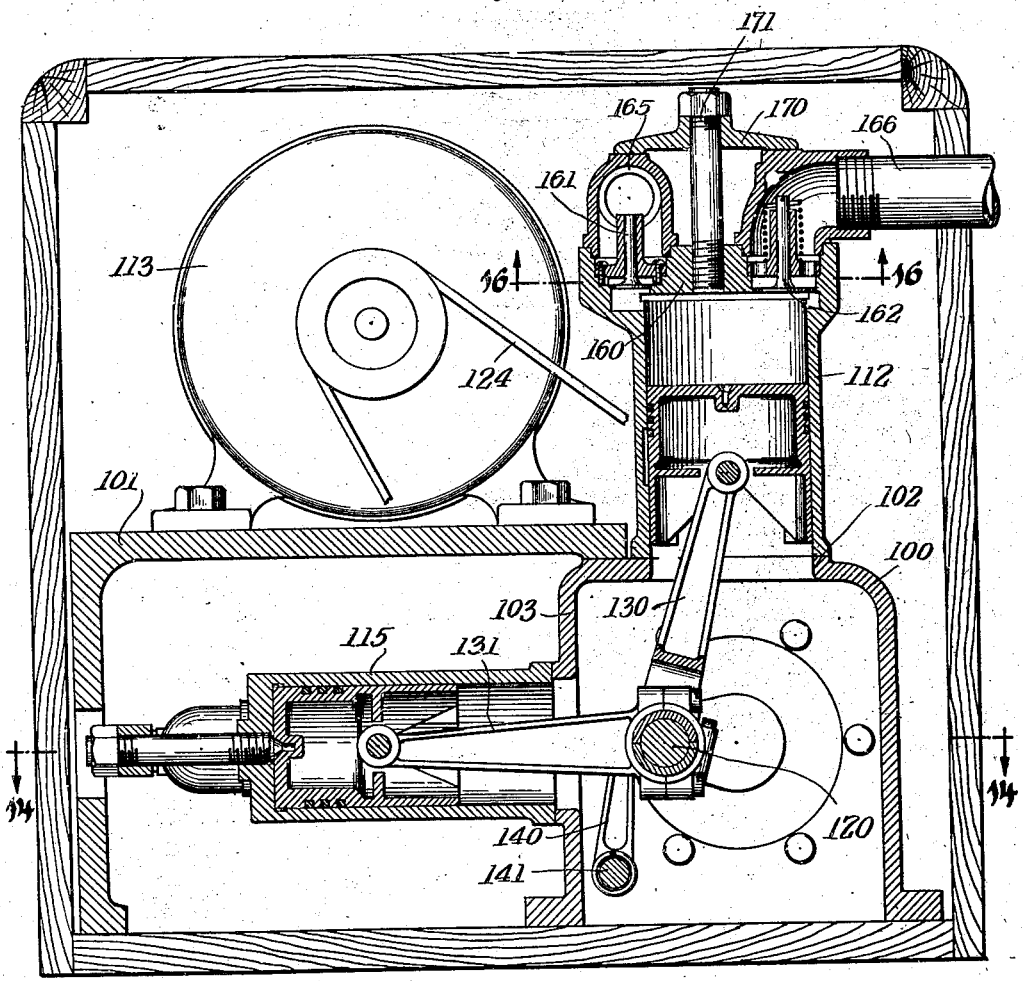

Feb. 17, 1931.  F. B. MacLAREN  1,792,649
REFRIGERATING MECHANISM
Filed July 24, 1923   6 Sheets-Sheet 5

INVENTOR
Fred B. MacLaren
BY
ATTORNEY

Feb. 17, 1931.  F. B. MacLAREN  1,792,649
REFRIGERATING MECHANISM
Filed July 24, 1923    6 Sheets-Sheet 6
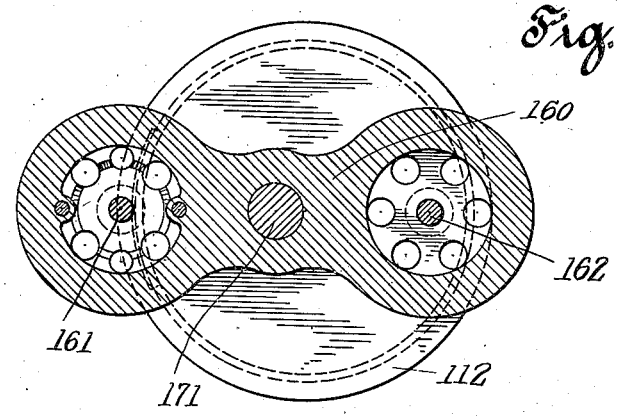
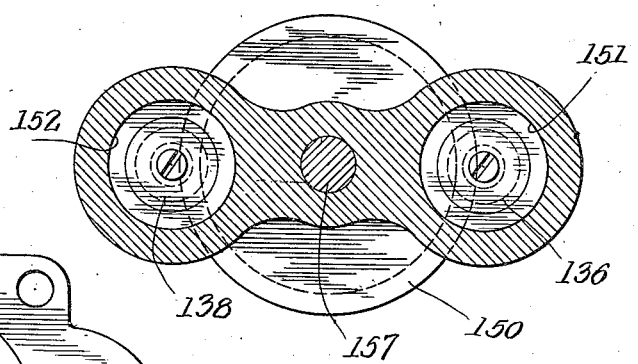
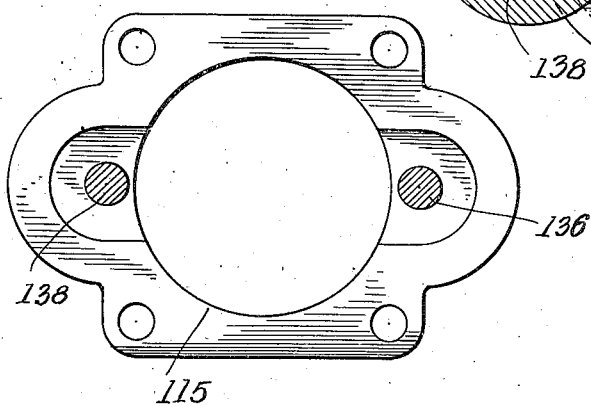
INVENTOR
Fred B. Maclaren
BY
ATTORNEY Patented Feb. 17, 1931

1,792,649

UNITED STATES PATENT OFFICE

FRED B. MacLAREN, OF MALBA, NEW YORK, ASSIGNOR TO THE MacLAREN ELECTRIC APPLIANCE CORPORATION, OF NEW YORK, N. Y., A CORPORATION OF DELAWARE

REFRIGERATING MECHANISM

Application filed July 24, 1923. Serial No. 653,467.

The present invention relates to improvements in refrigerators, particularly to that type of refrigerator in which air is compressed, cooled and allowed to perform work in expanding and thereby reducing the temperature to permit the air to be utilized for cooling and refrigeration.

It is an object of the present invention to provide an improved system of this character to thereby materially increase the thermo-dynamic efficiency in air refrigeration by providing a system in which the ratio of the volume of the compressing apparatus to the expansion motor and the actuation of the co-related valves for controlling the passage of air is such that the weight of air at the end of a cycle of operation is substantially the same as at the beginning of compression. For example, to provide a construction such as to avoid the creation of a vacuum on the expansion stroke of the expansion motor, and/or a manipulation of the valves to produce the desired results, and to avoid compression on the exhaust stroke of the expansion motor thereof.

Furthermore, an object is to provide a system so that the thermo-dynamic efficiency is thereby increased, since by avoiding a vacuum, the charge of cooled air in the expansion cylinder is not compressed by inrushing air, tending to raise the temperature, nor is it heated by mixing of the same with said inrushing air. By avoiding compression on the exhaust stroke, particularly air in the confined clearance space, a rise of the initial entrance temperature of the incoming air by mixture with the compressed air is avoided.

A further object of the present invention is to provide a refrigerating apparatus of the character indicated in which any tendency to heat the expanding air, as for example by possible production of a vacuum, is avoided.

A further object of the invention is to provide in a system of this character a refrigerating apparatus, in which the compression of the expanded air on the exhaust stroke is avoided and the initial temperature of the incoming air therefore maintained in as reduced a state as possible.

A further object of the present invention relates to a refrigerating apparatus of the character indicated in which a special intercooling action between the air circuits is provided, producing a compact and advantageous arrangement.

A further object of the present invention relates to a refrigerating system of the character indicated which operates upon the closed circuit circulation of the air employed as the refrigerating medium which may be used with an enclosed refrigerating space, box or the like.

A further object of the present invention relates to an apparatus of the character indicated in which the delivery of the cooled air in the expansion cylinder is muffled and at the same time satisfactorily delivered for uniform cooling of an enclosed chamber to provide a structure to eliminate noise, additional to means incorporated to eliminate and reduce vibration to a minimum.

A further object of the present invention relates to a system of this character, which provides for cooling by direct contact of the cooling air with the object to be cooled.

A further object of the present invention relates to a particularly advantageous structure of the mechanism employed, the location of same with respect to the various circulatory systems, the arrangement of driving motor, expansion motor and compressor, the control of the operation of the apparatus and a large number of other features of practical utility, as will be understood by those skilled in the art.

Various other objects are within the scope of this invention, such as relate to the arrangement of the related elements of the structure, and to various details of construction and to economies of manufacture and numerous other features as will be apparent from a consideration of the drawing and related description of a form of the invention, which may be preferred, in which Figure 1 is an elevation partly in section of a mechanism, showing an embodiment of the present invention.

Figure 2 is a plan view of Figure 1.

Figure 3 is a diagrammatic view, showing the control of the electric circuits for governing the operation of the mechanism.

Figure 4 is a horizontal sectional view through the machine.

Figure 5 is a vertical sectional view thereof.

Figure 6 is a rear elevational view corresponding to Figure 1.

Figure 7 is a sectional view taken on the line 7—7 of Figure 5.

Figure 13 is an elevation partly in section showing a modification of the apparatus.

Figure 16 is a sectional view of valves taken on the lines 16—16 of Figure 13.

Figure 17 is a sectional view of the valves taken on the lines 17—17 of Figure 14; and Figure 18 is an end view of the modifications of Figures 13 and 14.

Figure 8:
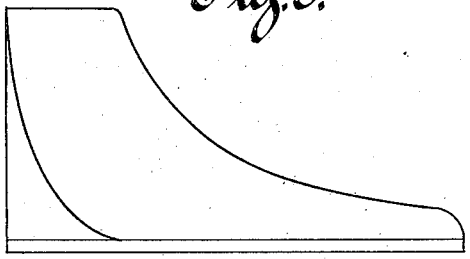
Figure 8 is an operating curve of an expansion motor showing the loss by reason of compression on the expansion stroke in prior certain existing devices.

Referring to Figure 1, the present invention, as illustrated, is applied to a refrigerator or heat insulated box 10 on the top of which in the present embodiment is located an air compresser and expansion motor with the operating mechanism therefor. Thus, there is shown a compressor 12 adapted to be operated by the electric motor 13, while an expansion motor 15 is in the present case located in horizontal tandem opposed relation with respect to the compresser 12, arranged to operate on a common shaft connected with the motor 13.

The compressor 12 compresses air, which is then cooled and allowed to operate the motor 15. To effect material reduction of air temperature, the air circuit is provided in the inlet pipe 20 shown in the upper left hand corner of Figure 1, where the air passes to the header of the air intercooler 21, passing through the pipes 22 shown in Figs. 1, 5 and 7 to the header 19 and terminating in the connector 23 leading to the inlet valve chamber 24 for the compressor. Upon a compression of the gas or air herein, the same is discharged through the outlet 25 to the pipe 26 shown in the upper right hand portion of Figure 1 and thence to an exterior radiator or cooling means 30 shown in the present instance as consisting of a plurality of zigzag pipes located at the rear of the refrigerator box 10, as illustrated in Fig. 6. The compressed air thus cooled is further cooled by being led back through the pipe 31 and suitable connections therewith to the inlet 32 of the inter-cooler 21. The air passes in the opening 33, shown in Figs. 5 and 7 into the space surrounding the pipes 22 and is further cooled by reason of the first passage of the air from the cooler 10 in entering the compressor. At the other end of the inter-cooler 21, the cooled air passes through the inlet manifold or union 35 into the inlet valve chamber 36 (shown in Fig. 4) of the expansion motor 15. The expansion motor is provided in the present instance with a plurality of control valves, namely, the inlet valve 37 and the exhaust valve 38 corelated in the action of the mechanism as will hereinafter appear to form one means to materially increase the thermo-dynamic efficiency of the refrigeration system. The exhaust chamber 39 of the expansion motor 15 is connected with the pipe 40 shown in Figs. 1 and 2 and the air passes into the heat insulated box 10 through the pipe 41.

As shown in Fig. 1, the pipe 41 terminates in a muffler 42 provided with suitable openings 43, as shown, to reduce the noise of operation to a minimum and to facilitate a proper directional impetus to the air delivered therethrough to provide a more uniform distribution of the cooled air within the refrigerator compartment as will more fully hereinafter appear.

The operation of the electric motor 13 is automatically controlled by the thermostat 50, the action being diagrammatically illustrated in Fig. 3, where it will be seen that a plurality of circuit controlling relays 51 are illustrated to be operated by the circuits established by the thermostatic switches 50, as will be understood by those skilled in the art.

The corelation of the compressor and expansion motor, the action and operation of the controlling valves therefor, the air circuits herein provided and the inter-cooling and manipulation thereof, constitute the present embodiment of means for providing a particularly efficient thermo-dynamic cycle of operation. A particular arrangement of the operating mechanism and the structural relation of the combined compression and expansion motor assembly is illustrated in Figures 4 and 5.

I have provided on the shaft 55 of the motor 13 a gear 56, adapted to mesh with and drive an internal gear 57 in the form of a fly-wheel to constitute an advantageous driving connection from the motor 13 to the crank shaft 58 of the combined compression and expansion motor. The crank casing 60 rests on the top of the inter-cooler 21, as shown in Figure 5, and is provided with bearing receiving terminals 61 and 62, shown in Figure 4. Suitable bearings therein support the crank shaft, as illustrated. The cover plate 63 is detachably secured, as shown in Figure 2 by the plate bolts 64, to the top of the crank case 60. The cylinder 70 of the compressor 12 is bolted to the crank case, while the compression piston 71 is illustrated as connected by the crank 72 to the crank shaft 58. It is particularly desirable to eliminate vibration and noise or to reduce the same to a minimum, and thus counterbalancing weights 73 are provided on the crank shaft and are so proportioned that when cooperating with the expansion motor they produce this result.

The cylinder 80 for the expansion motor 15 is located horizontally opposed and offset from the compressor 12 and is likewise bolted to the crank case 60, as shown. The piston 81 is likewise connected by the crank 82 to the crank shaft 58 and similar counter weights 83 are provided for the expansion motor crank shaft and crank 82. The cam shaft 85 is driven from a gear 86 from the crank shaft, the gear connection being opposite to the end of the crank shaft at which the motor 13 is located, as illustrated in Figs. 1 and 4. The cam shaft 85 has a plurality of cams 87, 88, and 89 adapted to operate the push rods 90, 91, and 92, as illustrated. The push rod 90 controls the inlet valve 94 for the compressor while the push rod 91 controls the inlet valve 95 for the expansion motor and the push rod 92 controls the exhaust valve 96 thereof. The valve mechanism of the expansion motor, the size of the same and the construction of the cam shaft and the proper timing of the valve operation constitute an important combination in the present embodiment for obtaining the objects sought by the present invention. The exhaust valve 98 for the compressor 12 is automatically operated when the pressure in the same attains a sufficient amount to overcome the spring 99, as will be understood from the description and drawings forming a part hereof.

Figure 9:
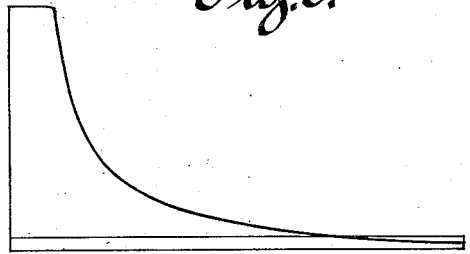
Figure 9 is a similar curve showing the loss due to formation of vacuum of such devices.

It will be noted that the cylinder 80 of the expansion motor is materially smaller in size than the cylinder 70 of the compressor and it is important to have the ratio of the relative volumes of the compressor and the expansion motor such as to equal the ratio of the absolute temperatures times the ratio of the absolute pressures where the temperature and pressure are taken at the end of the suction stroke of the compressor and at the end of the expansion stroke of the expansion motor. As a further feature of the present invention and as heretofore indicated and illustrated in Fig. 12, the timing of the operation of the apparatus is such that the outlet valve 96 of the expansion motor opens at, or just slightly before, dead center. It will thus be seen that with the proper ratio of the volume of the expander to the compressor when the air is taken from the box 10, compressed by the compressor, cooled and subsequently permitted to operate the expansion motor to expand therein, the volume of the same will be such as to eliminate a vacuum which as suggested by Fig. 9 has heretofore caused air to rush in the expansion motor tending to both heat the expanded air by compressing the same to a certain degree and mix the warm air therewith, both of which are overcome by the combination set forth.

In addition to the fact that there is no tendency to create a vacuum by this construction there also is another advantage. Inasmuch as the expanding cylinder is connected metallically to the compression pump there is a flow of heat by conduction from the compression pump to the walls of the expanding cylinder, with the result that as the air expands and greatly decreases in temperature there is a possibility of heat flowing from the walls of the cylinder to the air faster than the heat is given off by the expanding air so that the air will either remain at the same temperature, or perhaps even increase slightly in temperature. This will occur at the extreme end of the stroke where the decrease in temperature is very slight, and hence, if the air is exhausted from the expansion cylinder before the end of the stroke is reached, the pressure will perhaps not be quite as low as atmospheric pressure, but the heat absorbed from the cylinder walls will be considerably less than if the air is permitted to expand all the way, and a saving in refrigerating effect is therefore accomplished. From an inspection of Fig. 10 of the drawing, it is apparent that the greatest drop in pressure occurs near the beginning of the expansion stroke, and hence, by exhausting the air before the end of the expansion stroke is reached, little loss of cooling effect is necessitated.

Figure 10:
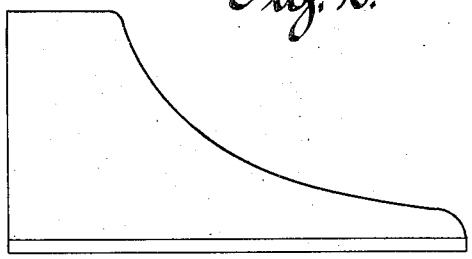
Figure 10 is the working curve approximated by the present invention.
Figure 12:
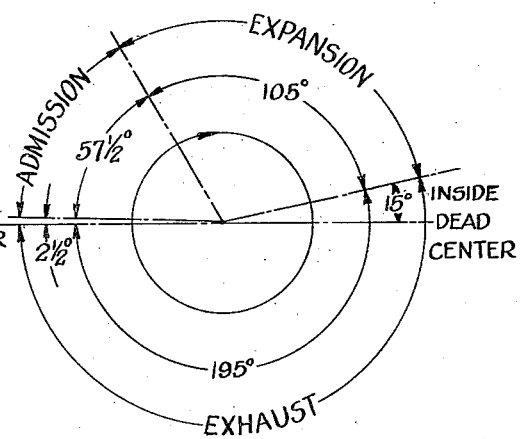
Figure 12 is a valve diagram of the expansion motor.

The operation of the valve 95 of the expander is to prevent compression of the expanding air on the exhaust stroke, to approximate the advantages of Fig. 10 and eliminate the disadvantages of Fig. 8, it being desirable to insure operation of the inlet valve 95, slightly after dead center as indicated at A, Fig. 12 in order to prevent the compression of the confined air retained in the clearance space which would otherwise mix with the incoming air and raise the initial temperature and therefore raise the final temperature. The mechanical operation of the mechanism heretofore described will be understood from the foregoing. The action of the electric thermostatic switch 50 starts the motor 13 in operation to compress the air drawn from the box 10 and will operate until the temperature drops sufficiently to cause the thermostat to open the circuit. The air drawn through the inlet pipe 20 is preliminarily effective to cool the compressed air in the intercooler 21 and passes to the inlet valve 94 of the compressor 12. The cam shaft and push rod 90 are operated at the proper time to admit a charge to the compressor and the piston 71 compresses the charge as will be understood. Heat radiating fins 100 are located on the compressor to assist in the cooling of the compressed gas and the air is then passed to the external radiator or air cooler 30, shown in Figure 6. As a further cooling instrumentality, the air is then passed to the intercooler 21 and is delivered to the expansion motor 15, the inlet valve 95 thereof operating at a period just stated, as will be understood from the cam and push rod mechanism heretofore described. The compressed air operates motor 15 and is then delivered through the exhaust valve thereof in the timed relation above specified to the pipe 41, the valve 96 opening before dead center is reached as indicated at B in Fig. 12, contrary to the actual practice of earlier valve closing to afford a buffing action for the mechanism in gaseous engines.

Figure 11:
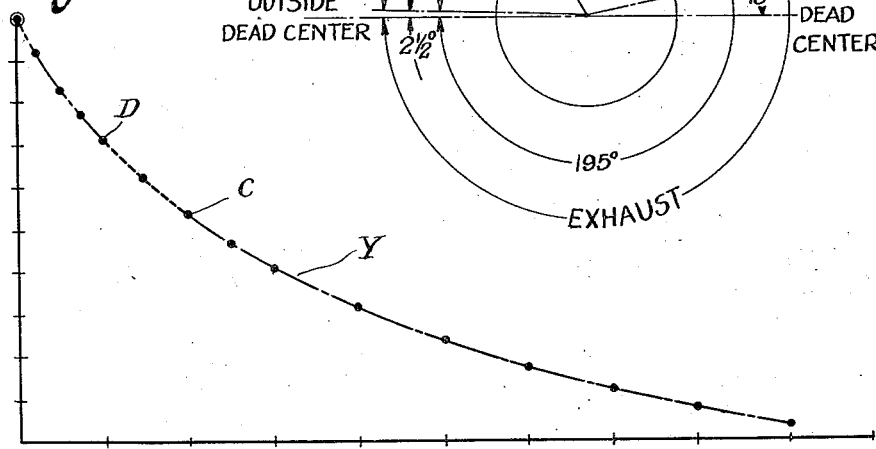
Figure 11 is a curve in which degree of temperaure drop (Fahrenheit) in the air is plotted against percent of compression stroke to show the increased efficiency of the present invention.

Figure 11 further illustrates the action of the present invention in the art of refrigeration. Ordinary air expansion means obtaining the curve of Fig. 8 operate in the part C D of the curve Y of Fig. 11, whereas in the present cycle by avoiding the compression at the end of the expansion stroke, from 92° to 100° in temperature drop is obtained with a loss of only 8° as against a loss of from 28° to 46°.

Figure 14:
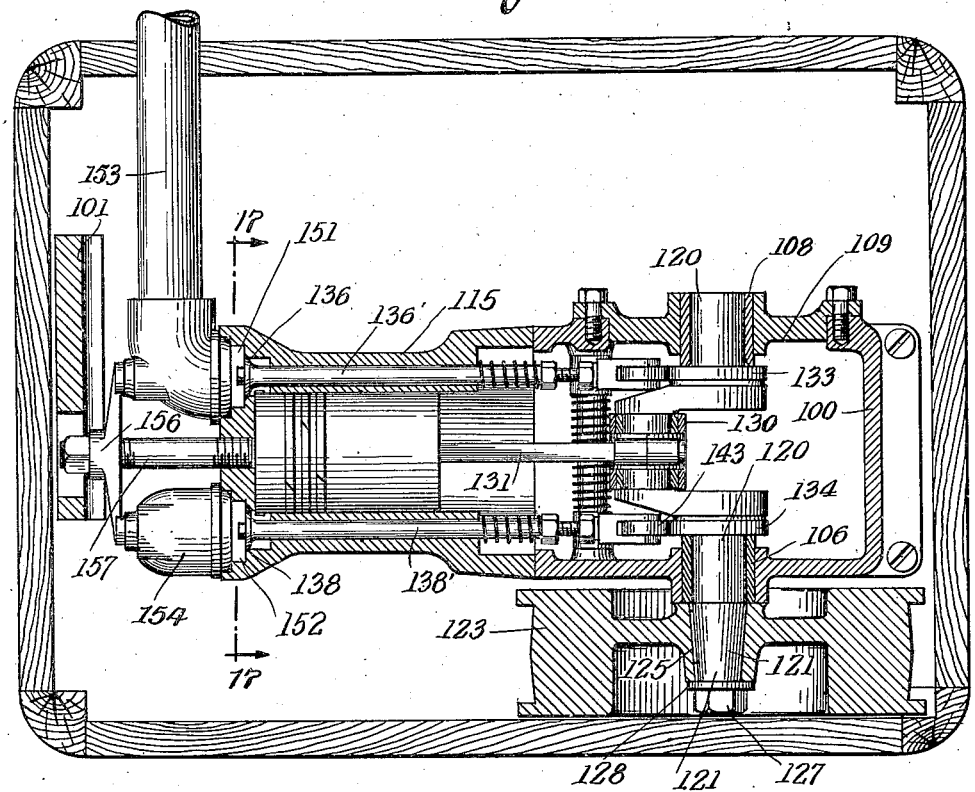
Figure 14 is a horizontal sectional view thereof.

Referring to Figs. 13 to 18, a modified likewise efficiently operating apparatus is shown compactly arranged and providing a casting 100 having a top plate 101 for mounting the driving motor 113, an opening 102 for receiving the compression cylinder 112, and a bridge piece 103 for receiving the expansion cylinder 115 located at right angles to the cylinder 112, the cylinders 112 and 115 having the same volumetric ratio as cylinders 12 and 15. The casting 100 as shown in Fig. 14 has a bearing 106 on the front side and rear bearing 108 carried by the plate 109 bolted to the casing. The crank shaft 120, mounted on the bearings 106 and 108 has a taper end 121 upon which is mounted the combined fly wheel and driving pulley 123, driven from the motor 113 by a belt 124. A Woodruf key 125 may be employed to connect the pulley 123 with the shaft 120, the latter having a lock nut 127 and washer 128 for assembling and holding the parts in position.

Figure 15:
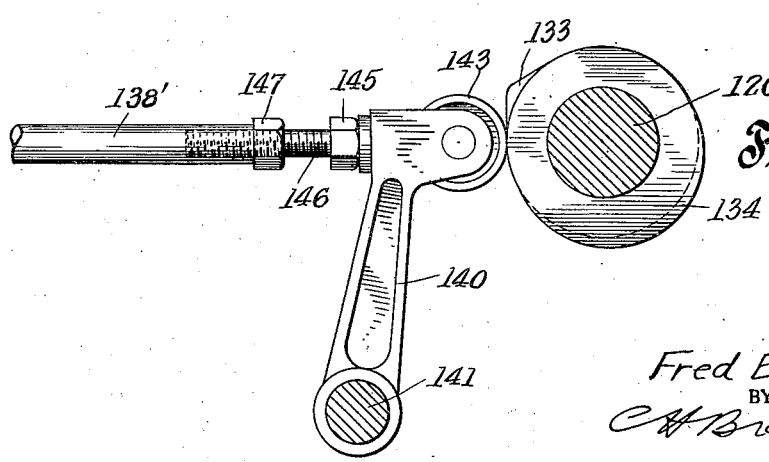
Figure 15 is a detail of the expansion motor valve operating mechanism of said modification.

The crank shaft 120 carries both the piston rods 130 and 131 as well as the valve cams 133 and 134 for operating the expansion motor valves 136 and 138. A preferred valve operating gear is shown in Fig. 15, where is shown a rocker arm 140 pivoted on the transverse rod 141 mounted on the casting 100 (see also Figs. 13 and 14). The arm 140 carries the cam roller 143 bearing against the cam 133 and contacts with the adjustable nut 145 of the push bolt 146 locked in the end of the valve stem 138' by the lock nut 147. The head 150 of the expansion cylinder 115 is provided with the intake 151 and exhaust port 152, the inlet and delivery pipes 153 and 154 being held connected thereto by the spider 156 bolted into the head 150 by a bolt 157.

The compressor 112 is provided in its head 160 with a gravity inlet valve 161 and likewise automatic spring operated outlet valve 162. The inlet and outlet pipes 165 and 166 are connected to the valve chambers 167 and 168 by elbows held in place by the spider 170 and bolt 171 similar to the construction previously described in connection with the expansion motor valve chamber assembly. The details of the valve construction are shown in Figs. 13 and 16.

The air circuit for the modification of Figs. 13 to 18 is similar to that of the form of apparatus shown in Figs. 1 to 17 in its intake into the compressor, the compression and exhaust therefrom, the cooling thereof and its operation in the expansion motor 115 by the valve action thereof according to the valve diagram of Fig. 12, whereby the advantageous results heretofore pointed out are thus likewise obtained in the modification. In operation as shown in the diagram the admission is delayed 2½ degrees and continues for 57½ degrees. The inlet valves 95 or 136 now close and expansion takes place, delivering the power thereof into the system. After 105° the exhaust valve opens 15° ahead of dead center to avoid the vacuum and remains open at least 195° to avoid the compression.

It is apparent that within the spirit of the invention modifications and different arrangements may be made other than as herein disclosed, and the present disclosure is illustrative merely, the invention comprehending all variations thereof.

Having thus described my invention, what I desire to secure by Letters Patent of the United States and claim is:

1. In a refrigerating apparatus, a container having a refrigerating compartmet, an air compressor adapted to draw air from said container, means to cool the compressed air comprising an air radiator carried by said container, means to further cool said air by the air drawn into said compressor, an expansion motor of smaller size than said compressor operated by said compressed air, an exhaust valve for said motor, means to deliver the expanded air from said expansion motor to said refrigerating chamber, means to muffle the air so delivered, and means to widely distribute the delivered air in said refrigerating compartment.

2. In a refrigerating apparatus, an air compressor having a piston, piston rod, and crank shaft, means to cool the compressed air, an expansion motor of such relative size with such a ratio of the volume of the expansion motor to the compressor as to avoid production of a vacuum upon the operation of said expansion motor, said motor having a piston connected to said crank shaft, valves for controlling said expansion motor, means to operate said valves to avoid a vacuum or substantial compression of air in said expansion motor, a motor for driving said compressor, and a combined pulley and fly wheel in said crank shaft for connection with said motor.

3. In a refrigerating apparatus, the combination of an air compressor; means for cooling the air compressed by the compressor; an expansion motor; a conduit intermediate the expansion motor and compressor; inlet and outlet valves connected to the expansion motor; and means for operating said valves to prevent compression in said expansion motor, said means including a common shaft; cams positioned on said shaft and displaced relative to each other in the plane of rotation of the shaft; a refrigerating chamber; means to deliver the expanded air into said chamber; and means to muffle the air so delivered.

4. In a refrigerating apparatus, the combination of an air compressor; an air expander; a conduit between the compressor and expander; a plurality of contiguous pipe sections in said conduit; means for operating said compressor and expander; a refrigerating chamber; a secondary cooling chamber, said cooling chamber being adapted to cool the compressed air as it moves from the compressor to the expander, the secondary cooling chamber forming a single unobstructed passageway for the contiguous pipe sections of the conduit; means to deliver the expanded air into said chamber; and means to muffle the air so delivered.

In testimony whereof, I affix my signature.

FRED B. MacLAREN.